US010063821B2

(12) United States Patent
Yoshimura

(10) Patent No.: US 10,063,821 B2
(45) Date of Patent: *Aug. 28, 2018

(54) PROJECTOR, AND BLACK LEVEL AREA SETTING METHOD FOR PROJECTOR

(71) Applicant: SEIKO EPSON CORPORATION, Tokyo (JP)

(72) Inventor: Jun Yoshimura, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 340 days.

This patent is subject to a terminal disclaimer.

(21) Appl. No.: 14/921,728

(22) Filed: Oct. 23, 2015

(65) Prior Publication Data

US 2016/0105655 A1 Apr. 14, 2016

Related U.S. Application Data

(63) Continuation of application No. 14/043,299, filed on Oct. 1, 2013, now Pat. No. 9,195,126.

(30) Foreign Application Priority Data

Oct. 12, 2012 (JP) ................................ 2012-227478

(51) Int. Cl.
*H04N 9/31* (2006.01)
*G03B 21/26* (2006.01)
(Continued)

(52) U.S. Cl.
CPC ......... *H04N 9/3182* (2013.01); *G03B 21/147* (2013.01); *G03B 21/26* (2013.01);
(Continued)

(58) Field of Classification Search
CPC .. H04N 9/3147; H04N 9/3182; H04N 9/3185; H04N 9/3197; G02B 27/32; G09G 2300/026; G03B 37/04
See application file for complete search history.

(56) References Cited

U.S. PATENT DOCUMENTS 6,184,934 B1 2/2001 Nishiki
6,369,858 B1 4/2002 Lee
(Continued)

FOREIGN PATENT DOCUMENTS

JP H11-355695 A 12/1999
JP 2001-168003 A 6/2001
(Continued)

*Primary Examiner* — Christina Riddle
*Assistant Examiner* — Christopher Lamb, II
(74) *Attorney, Agent, or Firm* — Oliff PLC

(57) ABSTRACT

A projector includes a projection optical system adapted to project an image modulated by a light modulation device on a projection surface, a guide display section adapted to dispose a plurality of guides used for setting a black level area, which is an adjustment target area of a black level, on the projection image, and then displays the guides in the case in which projection is performed on the projection surface so that the projection images from a plurality of projectors including the present projector partially overlap each other, an input operation section adapted to receive a position adjustment operation of each of the guides, and a black level area setting section adapted to set the black level area, which is the adjustment target area of the black level, based on an arrangement of the guides.

12 Claims, 11 Drawing Sheets

(51) Int. Cl.
*G03B 21/14* (2006.01)
*G03B 21/13* (2006.01)

(52) U.S. Cl.
CPC ......... *H04N 9/3147* (2013.01); *H04N 9/3185* (2013.01); *H04N 9/3197* (2013.01); *G03B 21/13* (2013.01)

(56) References Cited

U.S. PATENT DOCUMENTS

| | | | |
|---|---|---|---|
| 6,480,175 | B1 | 11/2002 | Schneider |
| 6,515,734 | B1 | 2/2003 | Yamada et al. |
| 2002/0024640 | A1 | 2/2002 | Ioka |
| 2002/0057361 | A1* | 5/2002 | Mayer, III ............... H04N 9/12 348/383 |
| 2005/0007561 | A1 | 1/2005 | Koyama et al. |
| 2005/0206857 | A1 | 9/2005 | Yamada |
| 2007/0273837 | A1 | 11/2007 | Furui |
| 2008/0062164 | A1 | 3/2008 | Bassi et al. |
| 2011/0211064 | A1 | 9/2011 | Furui |
| 2011/0234921 | A1* | 9/2011 | Ivashin ................ H04N 9/3147 348/745 |
| 2013/0083298 | A1 | 4/2013 | Yoshimura et al. |
| 2013/0141593 | A1 | 6/2013 | Bassi et al. |

FOREIGN PATENT DOCUMENTS

| | | |
|---|---|---|
| JP | 2001-343962 A | 12/2001 |
| JP | 2002-072359 A | 3/2002 |
| JP | 2003-274319 A | 9/2003 |
| JP | 2007-334179 A | 12/2007 |
| JP | 2008-103990 A | 5/2008 |
| JP | 2008-113416 A | 5/2008 |
| JP | 2009-005044 A | 1/2009 |
| JP | 2009-200613 A | 9/2009 |
| JP | 2011-182077 A | 9/2011 |
| JP | 2012-127993 A | 7/2012 |

* cited by examiner

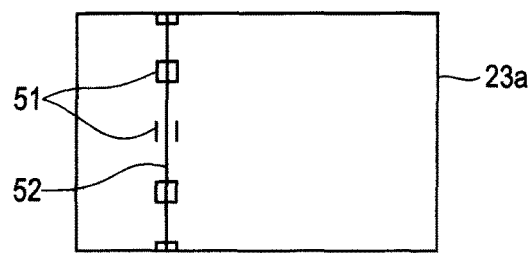 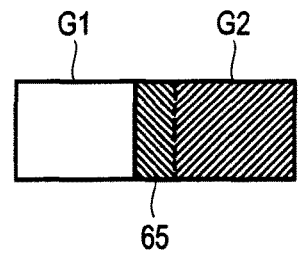
FIG. 5A　　　　　　　FIG. 5B
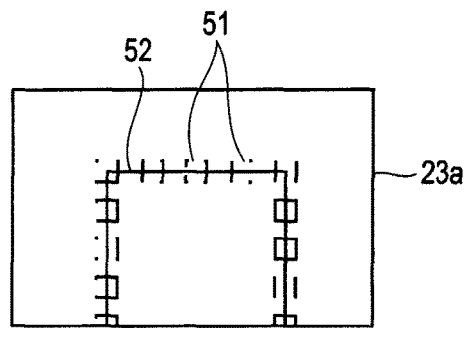 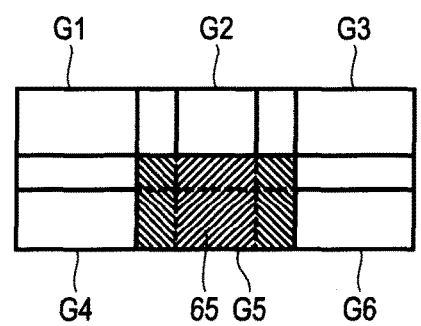
FIG. 5C　　　　　　　FIG. 5D

PROJECTOR, AND BLACK LEVEL AREA SETTING METHOD FOR PROJECTOR

CROSS-REFERENCE

This application is a continuation application of U.S. patent application Ser. No. 14/043,299, filed on Oct. 1, 2013. The entire disclosures of the above-mentioned application and Japanese Patent Application No. 2012-227478, filed Oct. 12, 2012, to which this application claims priority, are expressly incorporated by reference herein.

BACKGROUND

1. Technical Field

The present invention relates to a projector capable of a black level adjustment for adjusting a black level of a non-overlapping portion in order to resolve the black floating (lightening of black) due to leakage light in the case in which projection images from a plurality of projectors are projected on a projection surface so as to partially overlap each other, and a black level area setting method for the projector.

2. Related Art

As the projector of this kind, there has been proposed one disclosed in JP-A-2009-5044 (e.g., paragraphs [0081] through [0083]; Document 1). In Document 1, the projection image is shot by a camera, and then the black level area to be a black level adjustment target area is specified based on the shooting result.

However, using of the camera incurs rise in cost of the device accordingly. Further, in Document 1, setting of the black level area is restricted within the range of the projection image. Therefore, there is a problem that in the case in which a geometric correction is performed, it is not achievable to set the black level area with respect to the entire light modulation device, and thus, it is not achievable to resolve the black floating due to the leakage light in a non-image forming area where no image is formed.

SUMMARY

An advantage of some aspects of the invention is to provide a projector and a black level area setting method of a projector capable of setting a black level area without using a camera. Another advantage of some aspects of the invention is to provide a projector and a black level area setting method of a projector capable of setting a black level area in the entire area of a light modulation device.

An aspect of the invention is directed to a projector adapted to set a black level area, which is an adjustment target area of a black level, in order to resolve the black floating in an overlapping area in the case in which the projection is performed on a projection surface so that projection images from a plurality of projectors including the present projector partially overlap each other. The projector includes a projection optical system adapted to project an image, which is modulated by a light modulation device, on the projection surface, a guide display section adapted to display a guide used for setting the black level area, which is the adjustment target area of the black level, on the projection image, an operation section adapted to receive a position adjustment operation of the guide, and a black level area setting section adapted to set the black level area based on an arrangement of the guide on which the position adjustment operation by the operation section has been performed. Further, the projection optical system projects a black raster image when the black level area setting section sets the black level area.

The projector described above may be configured such that, in the case in which an assumed overlapping area assumed to be the overlapping area is set in the projection image, the guide display section disposes and displays the guide at a position based on the assumed overlapping area.

The projector described above may be configured such that the guide display section disposes and displays a plurality of guides on a boundary line of the assumed overlapping area at roughly regular intervals.

Another aspect of the invention is directed to a black level area setting method of a projector adapted to set a black level area, which is an adjustment target area of a black level, in order to resolve the black floating in an overlapping area in the case in which the projection is performed on a projection surface so that projection images from a plurality of projectors including the present projector partially overlap each other. The method includes: displaying a guide used for setting the black level area, which is the adjustment target area of the black level, on the projection image, receiving a position adjustment operation of the guide, and setting the black level area based on an arrangement of the guide on which the position adjustment operation has been performed.

According to the configuration of the aspect of the invention, since a user sets the black level area by performing the position adjustment operation of the guide displayed on the projection image, the black level area can be set without using a camera. Further, the black level area can be set without performing a complicated process such that the black level area is obtained by calculation from the projection conditions such as the arrangement of the projectors in the overlapping projection, the shape the projection surface, the presence or absence of the geometric correction, or the presence or absence of the blending process. In other words, in the case in which the overlapping projection is performed, by the user performing the position adjustment of the guides in accordance with the boundary between the overlapping area and a non-overlapping area while visually recognizing the projection images actually projected, it is possible to easily and accurately set the black level area. Further, since the plurality of guides are disposed on the boundary line of the assumed overlapping area assumed to be the overlapping area, the operation can be completed in a short period of time compared to the case of sequentially disposing the guides in the state in which no guide is disposed.

The projector described above may be configured such that the operation section is capable of performing the position adjustment of the guide taking an entire area of the light modulation device as a target.

According to the configuration of this aspect of the invention, even in the case in which the geometric correction is performed, it is possible to set the black level area in the entire area of the light modulation device. Normally, in the case of performing the geometric correction, since the light modulation device shrinks an image forming area corresponding to the projection image, a blank area (blanking) occurs. Although a black color is set to the blank area, in the case of performing the overlapping projection, the blank area is included in the target of the black floating due to the leakage light. Therefore, by making it possible to set the black level area to the entire area of the light modulation device, it is possible to resolve the black floating due to the leakage light not only in the image forming area of the light modulation device but also in a non-image forming area where no image is formed.

The projector described above may be configured such that the projector further includes a blending processing section adapted to perform a blending process adapted to make an overlapping part inconspicuous, and in a case in which the blending process is performed, the guide display section disposes and displays the plurality of guides on a boundary line of a blending area, which is a target area of the blending process in an initial state before the position adjustment operation.

According to the configuration of this aspect of the invention, since the blending process is generally performed on the overlapping area in the case in which the overlapping projection is performed, by disposing the plurality of guides on the boundary line of the blending area, the process of specifying the overlapping area can be eliminated.

The projector described above may be configured such that the projector further includes a geometric correction section adapted to perform a geometric correction for correcting a distortion of the projection image, and the guide display section varies the number of the guides to be displayed in accordance with a setting of the geometric correction.

According to the configuration of this aspect of the invention, since the geometric correction is often performed in accordance with the state of the projection surface, by making the number of the guides variable in accordance with the setting of the geometric correction, setting of the appropriate black level area corresponding to the state of the projection surface becomes possible.

It should be noted that the geometric correction denotes a point correction, a bow (pincushion) correction, a keystone correction, and so on.

The projector described above may be configured such that the geometric correction section is capable of performing, as the geometric correction, at least one of the point correction for correcting the distortion of the projection image by a position adjustment of each of intersections of a grid sectioning the projection image, and the bow correction for performing an arc shaped correction on each of upper, lower, right, and left sides of the projection image, and the guide display section varies the number of the guides to be displayed in accordance with at least one of a number of the intersections of the point correction, and presence or absence of the bow correction.

According to the configuration of this aspect of the invention, in the case in which the point correction or the bow correction is performed, since there is often the case that the shape of the boundary of the overlapping part of the projection image is complicated, by increasing the number of the guides, the black level area can more appropriately be set. Further, in the case in which the number of the intersections can arbitrarily be selected in the point correction, since it can be thought that the larger the number of the intersections is, the more complicated correction is performed, it is preferable to increase the number of the guides.

The projector described above may be configured such that the guide display section displays a guide line connecting the guides together with the plurality of guides, and in a case in which an area formed of the guide line after the position adjustment operation by the operation section, and a frame of the light modulation device fails to be a closed area, the black level area setting section extends an end portion of the guide line to the frame of the light modulation device to thereby form a plurality of closed areas, and then sets at least one of the plurality of closed areas as the black level area.

According to the configuration of this aspect of the invention, since the end portion of the guide line is extended, the user is not necessarily required to perform the position adjustment of the guides until the guide line reaches the frame of the light modulation device. Therefore, the operation time necessary for the position adjustment of the guides can be reduced.

It should be noted that it is preferable to set the area not including the blending area to at least one (the black level area) of the plurality of closed areas. According to the configuration of this aspect of the invention, it is possible for the user to save the trouble of designating the black level area after the position adjustment of the guides.

BRIEF DESCRIPTION OF THE DRAWINGS

The invention will be described with reference to the accompanying drawings, wherein like numbers reference like elements.

FIG. 5A is a diagram showing an example of displaying a guide in the case in which the blending process is performed in a left part of a projection image.

FIG. 5B is a diagram showing the projection state.

FIG. 5C is a diagram showing an example of displaying the guide in the case in which the blending process is performed in an upper part, a left part, and a right part of the projection image.

FIG. 5D is a diagram showing the projection state.

DESCRIPTION OF AN EXEMPLARY EMBODIMENT

Figure 1:
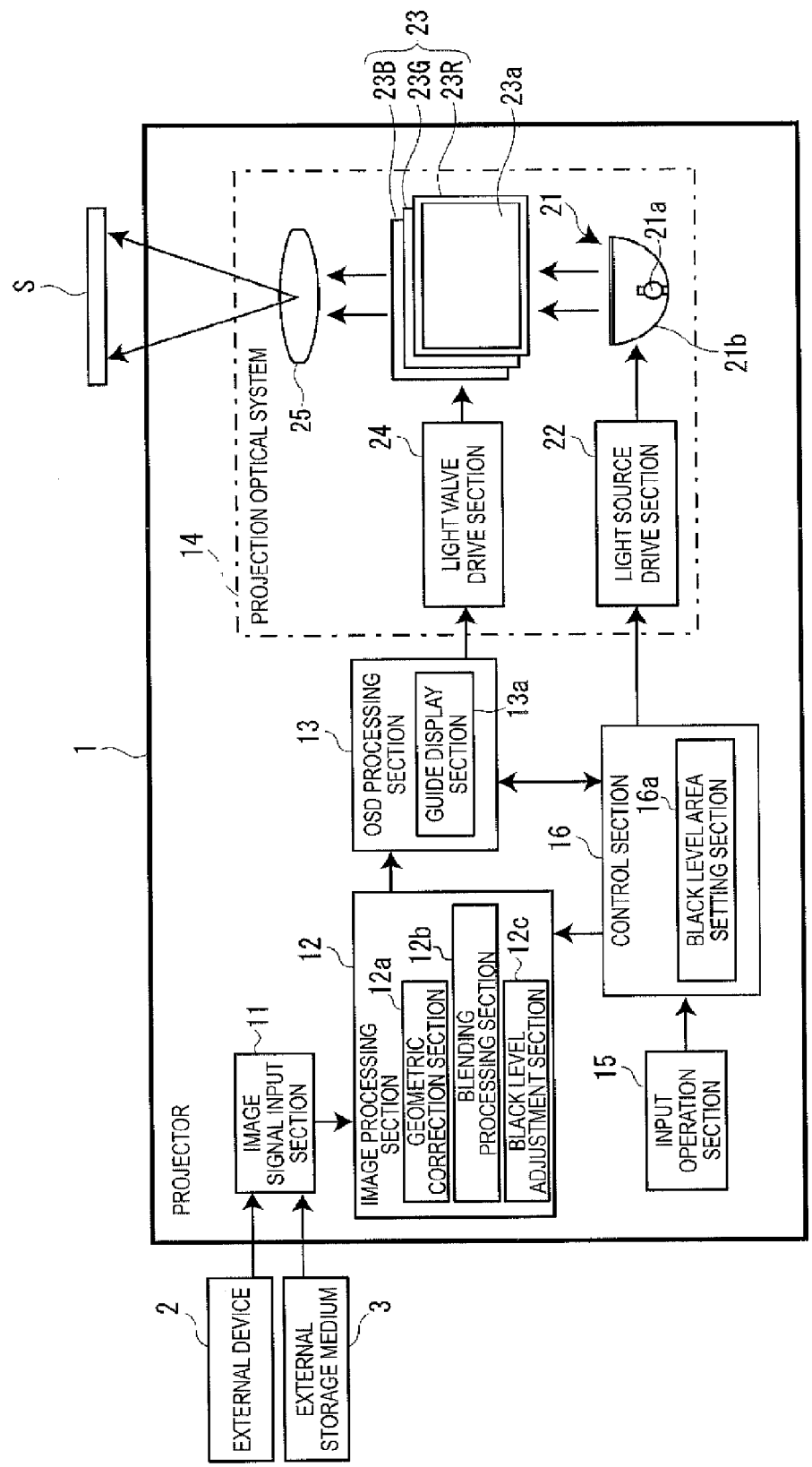
FIG. 1 is a block diagram showing a configuration of a projector according to an embodiment of the invention.

Hereinafter, an embodiment of the invention will be described with reference to the accompanying drawings. FIG. 1 is a block diagram showing a configuration of a projector 1. As shown in the drawing, the projector 1 is provided with an image signal input section 11, an image processing section 12, an OSD processing section 13, a projection optical system 14, an input operation section 15, and a control section 16 for controlling these sections.

The image signal input section 11 gets an image signal from an external device 2 such as a personal computer or a DVD player, or an external storage medium 3 such as a USB memory or a compact flash (a registered trade mark) memory card.

The image processing section 12 performs a predetermined image processing on the image signal, which is gotten by the image signal input section 11, based on an image processing program stored previously. In particular in the present embodiment, the image processing section 12 functions as a geometric correction section 12a, a blending processing section 12b, and a black level adjustment section 12c. It should be noted that as the image processing, image quality adjustment such as resolution conversion, sharpness adjustment, or luminance adjustment is included besides these functions.

The geometric correction section 12a performs a geometric correction such as a point correction, a bow (pincushion) correction, or a keystone correction in order to correct a distortion of a projection image G. Here, the point correction denotes an operation of correcting a partial distortion or adjusting a position of an overlapping portion in the case of performing projection with a plurality of projectors 1 disposed side by side. As a correction method, a user performs a position adjustment on each of intersections in a grid sectioning the projection image G from side to side and up and down, and then the correction is performed based on the position adjustment result. It should be noted that it is arranged that when performing the point correction, either one of "3×3," "5×5," and "9×9" can be selected as the number of intersections (points). Further, the bow correction denotes an operation for fine-tuning the distortion of a curved image due to slack or shrinkage of a projection surface (a screen). As the correction method, the user selects a side to be a correction target out of the upper, lower, left, and right sides of the projection image G, then designates a correction amount, and the correction of the bow shape is performed on the side to be the target based on the correction amount. Further, the keystone correction denotes an operation of regulating the distortion of the projection image G due to the difference in projection angle with the projection surface. As the correction method, either one of a vertical keystone correction, a horizontal keystone correction, and a corner portion keystone correction can be selected, and an angle correction and a position correction of the side (or an angle to be the target) to be the target are performed based on the correction amount designated by the user.

Figure 2:
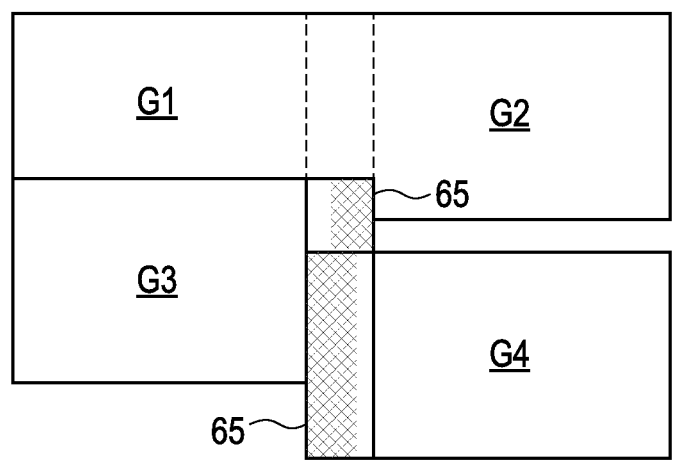
FIG. 2 is an explanatory diagram of a blending process.
Figure 2:
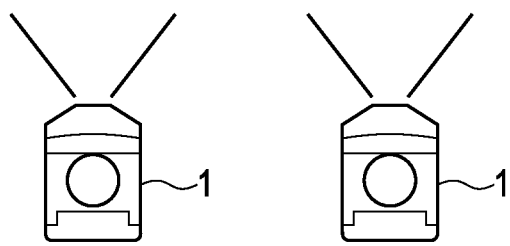

The blending processing section 12b performs a process of making a joint (an overlapping part) in the projection image G inconspicuous in the case of performing the projection with the plurality of projectors 1 disposed side by side. For example, in the example shown in FIG. 2, there is shown the case in which the blending process is performed on the overlapping part (the right part of a projection image G3 and the left part of a projection image G4) of the projection image G3 and the projection image G4 among projection images G1 through G4 projected by four projectors 1. In the case of performing the blending process, the user operates the input operation section 15 to perform range designation of a blending area 65, and then further designates a blending curve (how the gradation is applied). The blending processing section 12b performs the process of applying the gradation to the blending area 65 in accordance with these designations.

It should be noted that the blending area 65 can also be set in advance in accordance with the image content instead of the range designation performed by the user in the projector 1. For example, it is also possible to adopt the configuration in which a PC (video card) acting as a host of the plurality of projectors 1 sets the blending area 65 based on the image content for performing the multi-projection and a projection arrangement of each of the projectors 1, and setting information thereof is provided in addition to the image content to be supplied to each of the projectors 1.

Further, it is not necessarily required to supply the image contents different from each other to the respective projectors 1, but the same image content can also be supplied. On this occasion, it is possible for the user to perform setting of expansion/contraction of the image contents, panning, and so on in each of the projectors 1, and then perform the range designation of the blending area 65.

The black level adjustment section 12c performs a process of correcting the brightness and the color of a non-overlapping part in order to prevent the phenomenon (hereinafter referred to as "black floating") that the overlapping part of the projection image G becomes bright when displaying a dark image. It should be noted that a black level adjustment (color adjustment) will be described later.

The OSD processing section 13 generates on-screen display (OSD) information such as a setting/operation screen or a message based on an instruction from the control section 16, and then superimposes the OSD information on the image signal input from the image processing section 12. For example, a black level adjustment screen D1 and a color adjustment screen D2 (see FIGS. 4A and 4B) described later are also displayed by the OSD processing section 13.

Further, the OSD processing section 13 functions as a guide display section 13a. The guide display section 13a displays guides 51 for setting a black level area Eb, and a guide line 52 connecting the guides 51 with a straight line (see FIGS. 5A through 5D, 6A, 6B, 7, 8A, and 8B). It should be noted that a position adjustment of the guides 51 will be described later in detail. It should be noted that in absence of the instruction from the control section 16 to superimpose an OSD image, the OSD processing section 13 outputs the image signal, which is input from the image processing section 12, directly to a light valve drive section 24 without modification.

The projection optical system 14 is for projecting an image on a projection surface S such as a screen, and includes a light source section 21, a light source drive section 22, liquid crystal light valves 23 (a light modulation device), the light valve drive section 24, and a projection lens 25.

The light source section 21 is composed of a light source lamp 21a formed of, for example, a halogen lamp, a metal halide lamp, or a high-pressure mercury lamp, and a reflector 21b for reflecting light, which is emitted from the light source lamp 21a, in roughly the same direction. The light emitted from the light source section 21 is separated into colored light components of red (R), green (G), and blue (B) by a light separation optical system not shown, and the colored light components are subsequently input to the liquid crystal light valves 23 (23R, 23G, and 23B) for each color, respectively. The light source drive section 22 switches between lighting and extinction of the light source section 21 based on the instruction from the control section 16.

The liquid crystal light valves 23 are each formed of a liquid crystal panel having a liquid crystal material encapsulated between a pair of transparent substrates. The liquid crystal light valves 23 are each provided with a rectangular pixel area 23a having a plurality of pixels arranged in a matrix. The light valve drive section 24 applies a drive voltage corresponding to image information to each of the pixels of the liquid crystal light valves (the pixel areas 23a) to thereby set the light transmittance of each of the pixels.

According to the configuration described above, in the projection optical system 14, the light emitted from the light source section 21 is modulated while being transmitted through the pixel area 23a of each of the liquid crystal light valves 23, and thus an image corresponding to the image signal is formed for each of the colored lights. The images of the respective colors thus formed are combined pixel by pixel by a light combining optical system (e.g., a dichroic prism) not shown, and are then projected on the projection surface S by the projection lens 25.

The input operation section 15 is an operation device (e.g., an operation panel) for receiving an input operation from the user, and is provided with a plurality of operation keys. When the user operates a variety of operation keys of the input operation section 15, the input operation section 15 outputs an operation signal corresponding to the operation content by the user to the control section 16. In the present embodiment, the input operation section 15 is mainly used for a position adjustment of the guides 51, an operation of an OSD screen, and so on. It should be noted that a remote controller for performing a remote operation can be used as the operation device. In this case, it is sufficient to provide a signal receiving section, which receives the operation signal (an infrared ray) from the remote controller, to a main body of the projector 1.

The control section 16 is composed of a central processing unit (CPU), a read only memory (ROM), a random access memory (RAM), and so on, and performs input and output of signals with respective sections to thereby perform overall control of the projector 1. Further, the control section 16 functions as a black level area setting section 16a. The black level area setting section 16a sets the black level area Eb based on the arrangement of the guides 51 the positions of which are adjusted by the user (see FIGS. 9A through 9C, 10A through 10C, and 11A through 11C). Setting of the black level area Eb will be described later. It should be noted that the control section 16 also performs processing instructions to the geometric correction section 12a, the blending processing section 12b, and the black level adjustment section 12c described above, and a display instruction to the guide display section 13a. Therefore, these sections in the appended claims are realized by the control section 16 and the image processing section 12 cooperating with each other, or the control section 16 and the OSD processing section 13 cooperating with each other.

Figure 3:
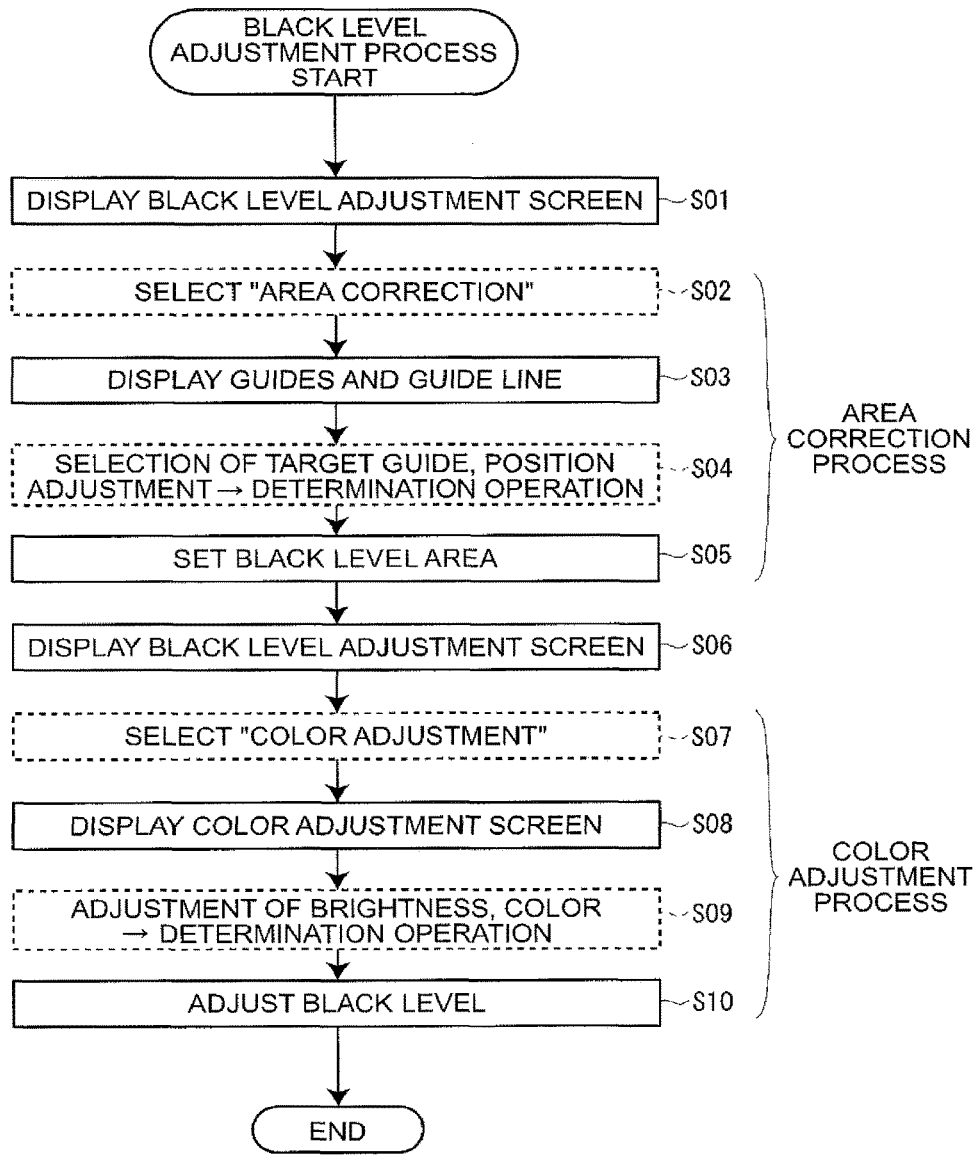
FIG. 3 is a flowchart showing a flow of a black level adjustment process.
Figure 4A:
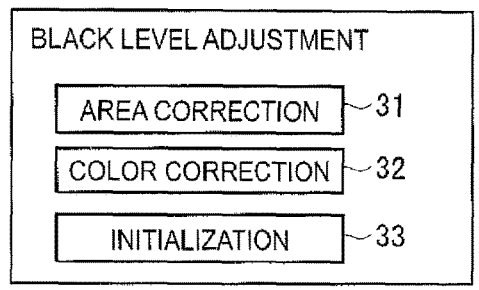
FIG. 4A is a diagram showing a black level adjustment screen.
Figure 4B:
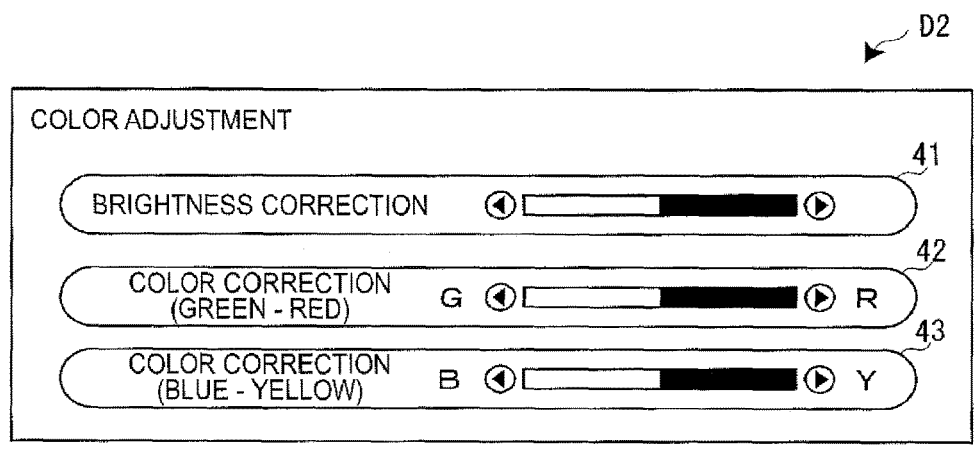
FIG. 4B is a diagram showing a color adjustment screen.

Then, with reference to the flowchart shown in FIG. 3 and screen displays shown in FIGS. 4A and 4B, the flow of the black level adjustment process will be explained. In FIG. 3, solid line frames indicate the operation of the projector 1, and dotted line frames indicate the operation by the user. Further, it is assumed that the blending process is performed prior to the present process, and the blending area 65 has been determined. It should be noted that if the process is performed so that the black level adjustment is performed on the area on which the blending process has not been performed, since there is a case in which there remains the part where the black floating occurs due to the factor such as the geometric correction, the present process of performing the setting of the black level area Eb and then adjusting the black level (increasing the luminance of the part where the black floating does not occur) is helpful.

When the user instructs the black level adjustment, the projector 1 (the control section 16) displays (S01) the black level adjustment screen D1 as the OSD image. As shown in FIG. 4A, the black level adjustment screen D1 includes an area correction button 31, a color adjustment button 32, and an initialization button 33. When the area correction button 31 is selected, the projector 1 performs an area correction process, and when the color adjustment button 32 is selected, a color adjustment process is performed. Further, when the initialization button 33 is selected, the projector 1 initializes an area correction value and a color correction value. Here, it is assumed that the area correction button 31 is first selected (S02). When the area correction button 31 is selected in the black level adjustment screen D1, the plurality of guides 51 and the guide line 52 connecting the guides are formed on the boundary line of the blending area 65 in the pixel areas 23a of the liquid crystal light valves 23 (the display in the initial state). On this occasion, the guides 51 and the guide line 52 are displayed (S03) on the projection surface S so as to be superimposed on the projection image G (a black raster image). The user performs (S04) selection of a target guide 51d to be the target of the position adjustment and the position adjustment operation while looking at the projection surface S. However, in the case in which the blending area 65 and the overlapping area of the projection images G completely coincide with each other, the position adjustment operation is unnecessary. When the position adjustment operation by the user is fixed, the projector 1 sets (S05) the black level area Eb based on the arrangement of the guide line 52 at the time point when the operation is fixed. The steps S02 through S05 described hereinabove correspond to the flow of the area correction process.

After the area correction process, the projector 1 displays (S06) the black level adjustment screen D1 (see FIG. 4A) again. Here, it is assumed that the color adjustment button 32 is selected (S07). When the color adjustment button 32 is selected, the projector 1 displays (S08) the color adjustment screen D2 as the OSD image. As shown in FIG. 4B, the color adjustment screen D2 includes a brightness correction gauge 41, a color correction (green-red) gauge 42, and a color correction (blue-yellow) gauge 43. When the user performs the adjustment operation of the brightness and the color using these gauges, and then further performs (S09) a determination operation, the projector 1 performs (S10) the black level adjustment (the adjustment of the brightness and the color with respect to the black color) on the black level area Eb.

Specifically, when the operation to the brightness correction gauge 41 is performed in the color adjustment screen D2, the projector 1 adjusts the black level of the black level area Eb. Further, when the operation to the color correction (green-red) gauge 42 is performed, the projector 1 adjusts the color between the green color and the red color in the black level area Eb. Further, when the operation to the color correction (blue-yellow) gauge 43 is performed, the projector 1 adjusts the color between the blue color and the yellow color in the black level area Eb. The steps S07 through S10 described hereinabove correspond to the flow of the color adjustment process.

It should be noted that if the setting of the blending area 65 is changed in the blending process performed prior to the black level adjustment process described above, the setting (the area correction value and the color adjustment values) of the black level adjustment process is canceled (initialized). Further, in the case of performing the initialization (e.g., the case in which the initialization button 33 is selected, and the case in which the setting of the blending area 65 is changed), the color adjustment button 32 is set to an unselectable state (gray out) in the black level adjustment screen D1 of FIG. 4A. In other words, the color adjustment button 32 becomes selectable only in the state in which the black level area Eb is set.

Hereinafter, the details (the setting of the black level area Eb) of the area correction process will be described with reference to the drawings on and after FIG. 5A. Firstly, guide display (the display of the initial state after holding down the area correction button 31) will be explained with reference to FIGS. 5A through 5D, 6A, and 6B. FIGS. 5A and 5C each show an example of the guide display in the case in which the geometric correction is not performed.

As shown in both of the drawings, the guide display is displayed so as to be superimposed not on the image input from the external device 2, but on the black raster image. The reason that the black raster image is displayed is for making it easy to visually check the part (the bright part) where the black floating occurs in the projection image G and the part (the dark part) where the black floating does not occur. Further, during the guide display, the black raster image is displayed in the state in which the black level is not adjusted so as not to hinder the range designation operation of the black level area Eb. Further, although one projector 1 is mentioned alone in the drawing, it is preferable that another projector 1, which performs overlapping projection on the projection surface S, also displays the black raster image in the same manner during the range designation operation of the black level area Eb.

FIG. 5A shows an example of the guide display in the case in which the blending process is performed in the left part of the projection image G. The projection state assumed on this occasion is as shown in FIG. 5B. Specifically, in the case in which the projection images G1, G2 are projected in a state of a horizontal arrangement, namely right and left, the left area of the projection image G2 expressed with hatching is set as the blending area 65. Therefore, the projector 1 for projecting the projection image G2 displays the guides 51 and the guide line 52 on the left (the end of the blending area 65) where the blending process is effective in the pixel areas 23a of the liquid crystal light valves 23.

On this occasion, the guides 51 and the guide line 52 are displayed with a white color. Further, the guide line 52 forms a straight line in the pixel areas 23a. Further, the guides 51 are arranged at roughly regular intervals with respect to the guide line 52, and the number of guides 51 varies in accordance with the setting of the geometric correction. For example, in the example shown in the drawing, two points at the ends and three points in the middle, totally five points of guides 51 are shown with respect to the guide line 52 of one side. However, in the case of performing the point correction or the bow correction, it is assumed that the projection surface S is not a plane, and the shape of the overlapping part of the projection images G becomes complicated (the shape of the black level area Eb becomes complicated), and therefore, it is preferable to increase the number of the guides 51 to be larger than the number to be the reference. Further, when performing the point correction, either one of "3×3," "5×5," and "9×9" can be selected as the number of intersections. It is preferable to increase the number of the guides in accordance with the increase in the number of the intersections. Further, since the keystone correction is the correction performed generally in the case in which the projection surface S is a plane, in the case in which the keystone correction is performed, the number of the guides can be reduced to be smaller than the reference number.

On the other hand, FIG. 5C shows an example of the guide display in the case in which the blending process is performed in the upper part, the left part, and the right part of the projection image G. The projection state assumed on this occasion is as shown in FIG. 5D. Specifically, in the case in which the multi-projection is performed as shown in the drawing with images G1 through G6, the upper area, the left area, and the right area of the projection image G5 expressed with hatching are set as the blending area 65. Therefore, the projector 1 for projecting the projection image G5 displays the guides 51 and the guide line 52 on the upper side, the left side, and the right side (the inner ends of the blending area 65) where the blending process is effective in the pixel areas 23a.

Figure 6A:
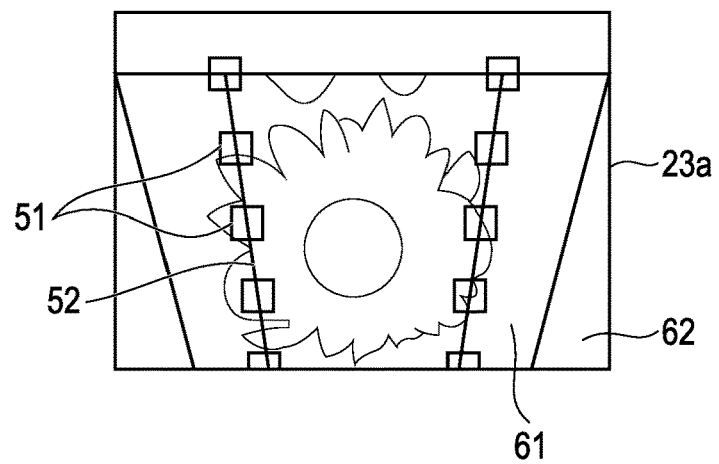
FIG. 6A is a diagram showing an example of displaying a guide in the case in which a keystone correction is performed.
Figure 6B:
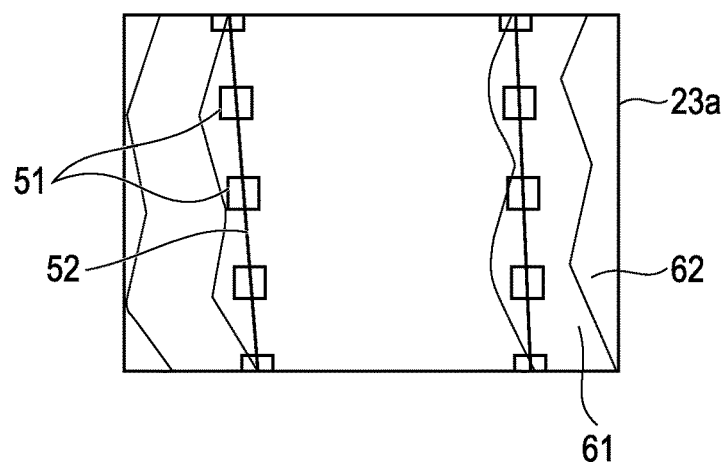
FIG. 6B is a diagram showing an example of displaying a guide in the case in which a point correction is performed.

Further, FIGS. 6A and 6B each show an example of the guide display (an example of the display in the initial state after holding down the area correction button 31) in the case in which the geometric correction is performed. FIG. 6A shows the case in which the keystone correction is performed, and at the same time, the blending process is performed in the left part and the right part of the projection image G. Further, FIG. 6B shows an example of the guide display in the case in which the point correction is performed, and at the same time, the blending process is performed in the left part and the right part of the projection image G. In the case in which the geometric correction is performed in such a manner, since an image forming area 61 (the area where the image corresponding to the projection image G is formed) is shrunk in the pixel areas 23a, a non-image forming area 62 occurs. In this case, the guides 51 and the guide line 52 are displayed on the boundary line of the blending area in the image forming area 61, and are therefore displayed within the image forming area 61. Further, also in the case in which the geometric correction is performed, the guide line 52 forms a straight line in the pixel areas 23a.

Figure 7:
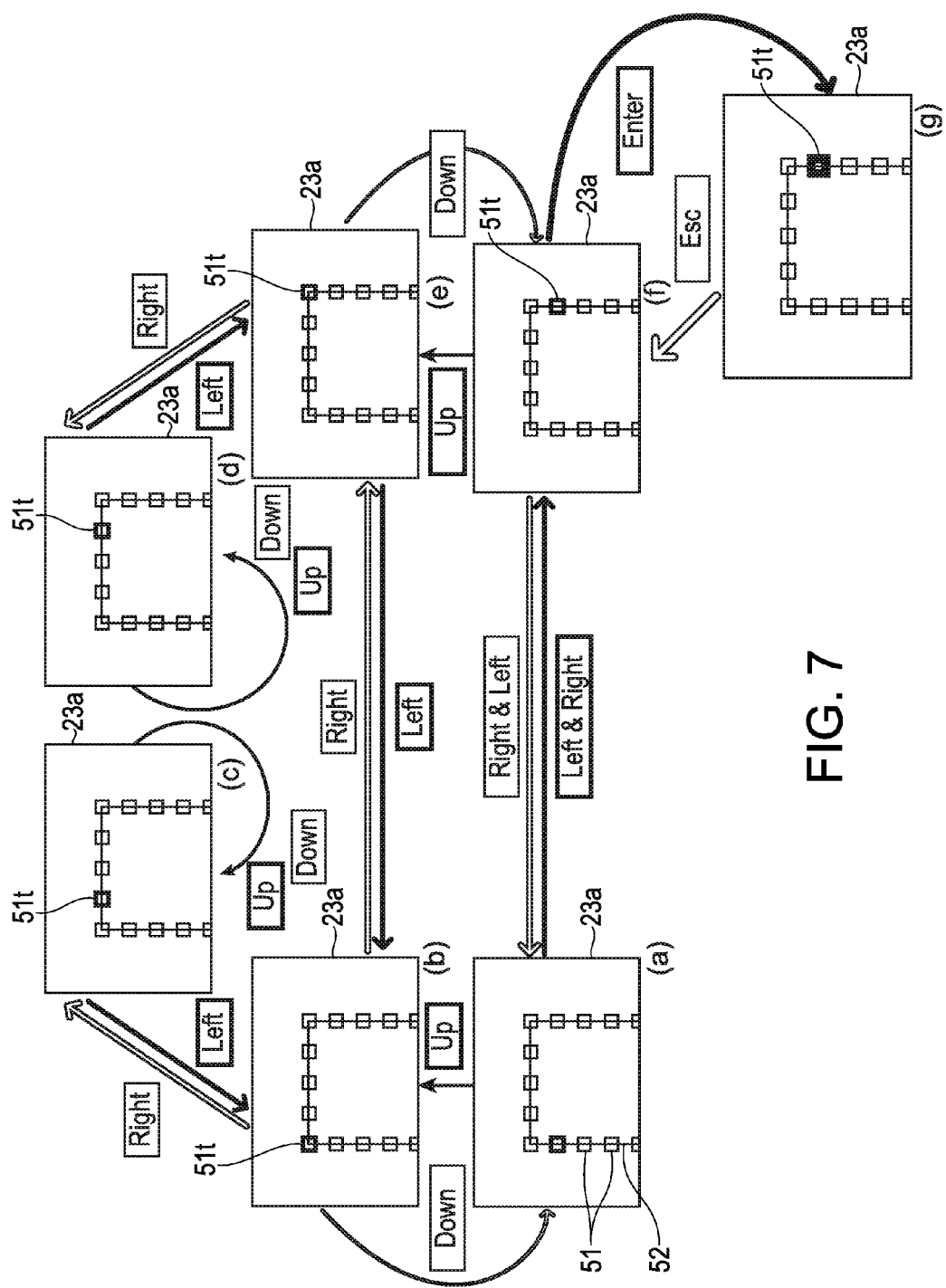
FIG. 7 is a diagram showing a selection operation of a target guide.

Then, the position adjustment of the guides 51 will be explained with reference to FIGS. 7, 8A, and 8B. As shown in pictures (a) through (g) in FIG. 7, the user selects the target guide 51d to be the target of the position adjustment using up, down, left, and right keys provided to the input operation section 15. A guide 51t in a tentative selection state before the selection determination operation is displayed with a color (e.g., an orange color) different from other guides 51, and turns to be a definite state (turns to be the target guide 51d; see the picture (g) in FIG. 7) due to holding down of an "Enter" key. The target guide 51d is indicated by, for example, a double frame with the orange color. Further, due to holding down of an "Esc" key, the target guide 51d is restored (see the picture (f) in FIG. 7) to the tentative selection state.

Figure 8A:
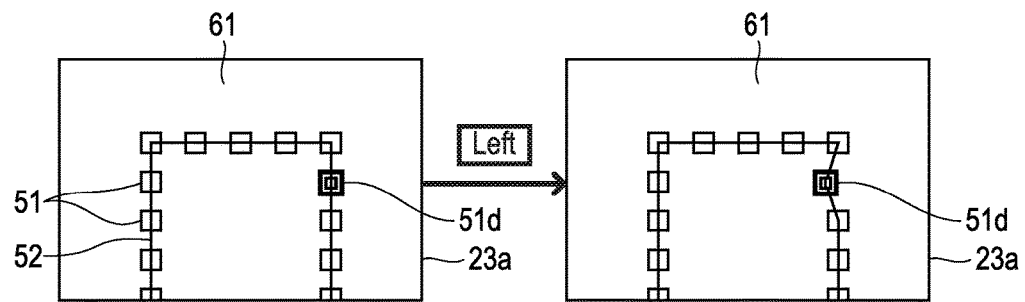
FIG. 8A is a diagram showing an example of a position adjustment of a target guide within an image forming area.
Figure 8B:
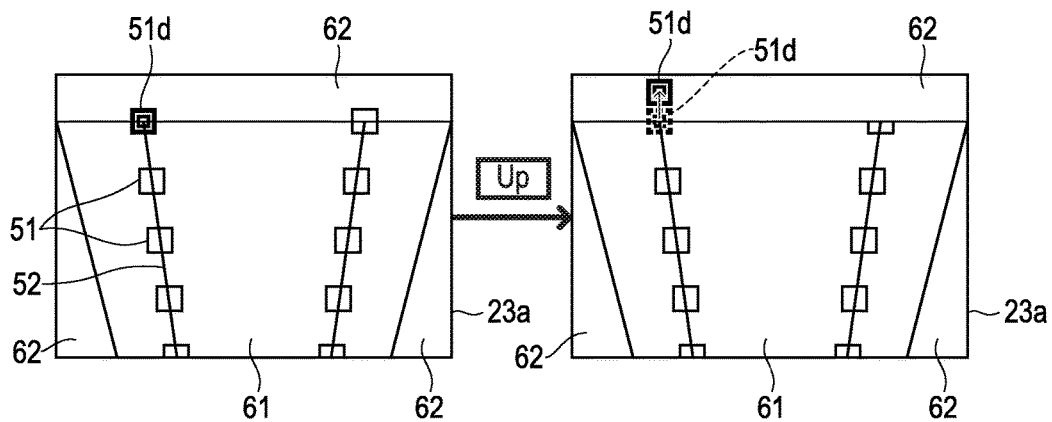
FIG. 8B is a diagram showing an example of a position adjustment of the target guide within a non-image forming area.

FIG. 8A shows an example of the position adjustment of the target guide 51d within the image forming area 61, and FIG. 8B shows an example of the position adjustment of the target guide 51d within the non-image forming area 62. It should be noted that FIG. 8B shows the case in which the keystone correction is performed. In either of the cases, the target guide 51d moves 1 pixel at a time in accordance with holding down of the up, down, left, and right keys of the input operation section 15. Further, when the user keeps holding down either of the up, down, left, and right keys, the target guide 51d moves (automatic repeat) in proportion to the holding down time. It should be noted that the translation of the target guide 51d does not exchange the positional relationship of the guides 51 on the guide line 52. Further, the guides 51 are not allowed to move to a position close to the adjacent guide at a distance of a predetermined length (e.g., 9 pixels) or less.

Further, as shown in FIG. 8B, the target guide 51d is allowed to move to the inside of the non-image forming area 62. On this occasion, the guide line 52 is also extended in accordance with the translation of the target guide 51d. As described above, the target guide 51d is allowed to move in the entire pixel areas 23a. The user sequentially disposes the guides 51 on the boundary between the part where the black floating occurs on the projection surface S and the part where the black floating does not occur by the operation described above. Further, when completing the position adjustment operation of the guides 51, the user performs the determination operation (e.g., holding down of the "Enter" key) to thereby terminate the guide display. It should be noted that in the case of FIG. 8B, the black raster image is displayed in the image forming area 61, and the non-image forming area 62 is set to be black due to blanking. Instead, it is also possible to display the black raster image in the entire pixel areas 23a, and further provide color coding with black and gray in order to distinguish the image forming area 61 and the non-image forming area 62 from each other.

It should be noted that it is possible to arbitrarily change the number of the guides 51 to be displayed due to the user operation in the area correction process. For example, in the case in which the number of guides is increased, although the guides 51 are evenly added to the guide line 52, the shape of the guide line 52 is not updated (does not change). In contrast, in the case in which the number of guides is decreased, the guides 51 are evenly thinned in the guide line 52, the shape of the guide line 52 is updated accordingly.

Figure 9A:
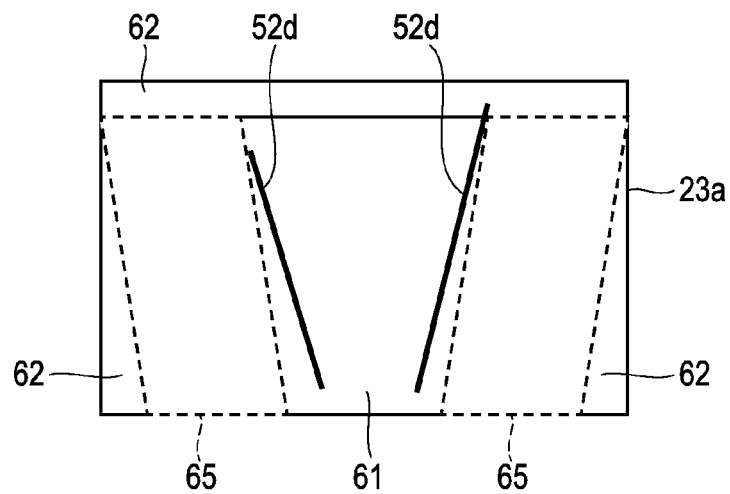
FIG. 9A is a diagram showing an example of definite guide lines (two noncrossing line type).
Figure 9B:
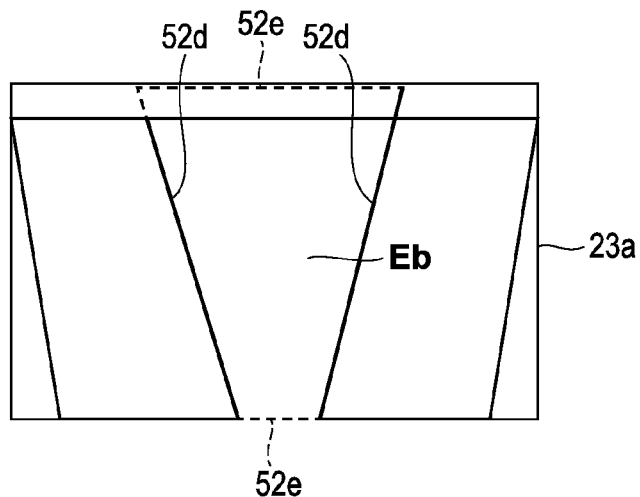
FIG. 9B is a diagram showing the state in which a black level area is set based on the definite guide lines.
Figure 9C:
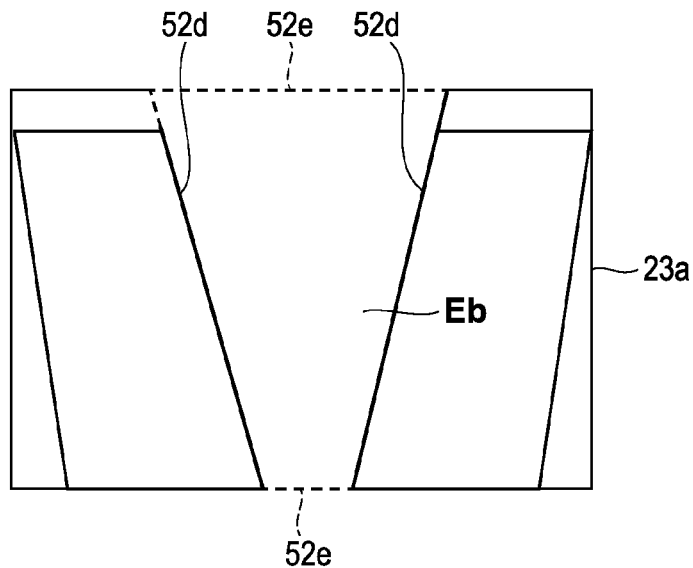
FIG. 9C is a diagram showing the state in which the black level adjustment process is performed on the black level area.

Then, setting of the black level area Eb after the completion of the position adjustment operation of the guides 51 will be explained with reference to FIGS. 9A through 9C, 10A through 10C, and 11A through 11C. FIGS. 9A through 9C show the case in which the keystone correction is performed, the blending process is performed in the left part and the right part, and the guide lines 52 are fixed in the state (two noncrossing type) shown in FIG. 9A. It should be noted that in FIG. 9A, two areas each surrounded by a dotted line indicate the blending areas 65 to be the target of the blending process. In other words, the left part and the right part of the drawing correspond to the overlapping area with other projection images G. Further, a reference symbol 52d denotes the guide lines 52 (hereinafter referred to as "definite guide lines 52d") determined by the position adjustment operation of the guides 51.

As shown in FIG. 9B, in the case in which the end portions of the guide lines 52 fail to reach the frame of the pixel area 23a (the case in which the area formed of the guide lines 52 and the frame of the pixel area 23a fails to be a closed area), the projector 1 (the control section 16) extends the end portions of the guide lines 52 to the frame of the pixel area 23a. A reference symbol 52e denotes the extended part (hereinafter referred to as an "extension guide line 52e") of the guide lines 52. As described above, by adding the extension guide lines 52e to the definite guide lines 52d, three closed areas are formed in the pixel area 23a shown in the drawing. Among these areas, the area not including the blending area 65 shown in FIG. 9A (or the area including the blending area 65 at only a small proportion) is set as the black level area Eb. In other words, the area having no overlap with other projection images G out of the three closed areas is set to the black level area Eb. As shown in FIG. 9C, the black level adjustment of raising the black level (lightening the black color) is performed on the black level area Eb thus set based on the setting of the color adjustment screen D2 shown in FIG. 4B.

Figure 10A:
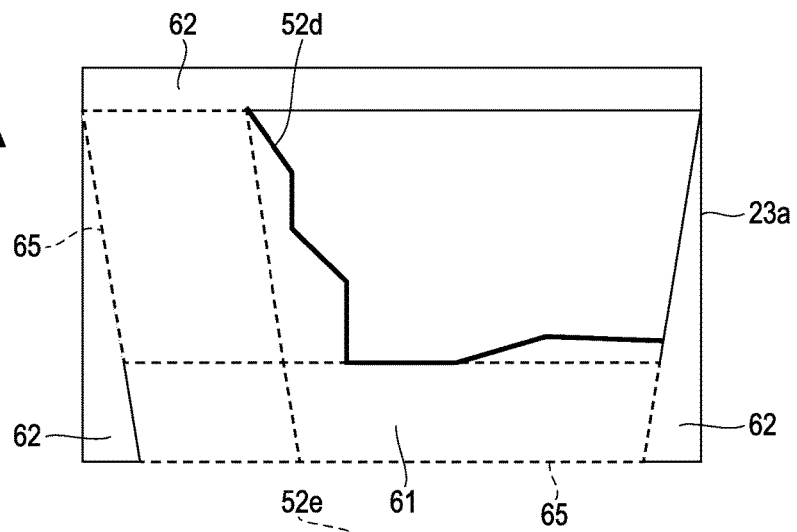
FIG. 10A is a diagram showing an example of a definite guide line (one roughly L type).
Figure 10B:
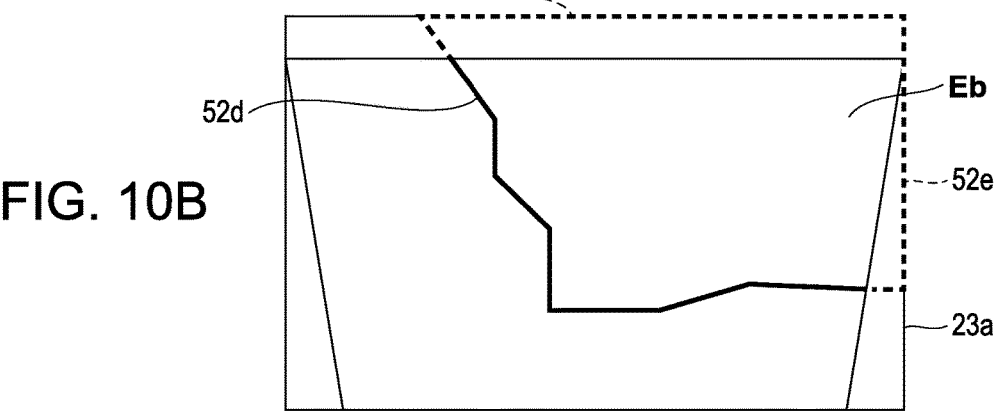
FIG. 10B is a diagram showing the state in which the black level area is set based on the definite guide line.
Figure 10C:
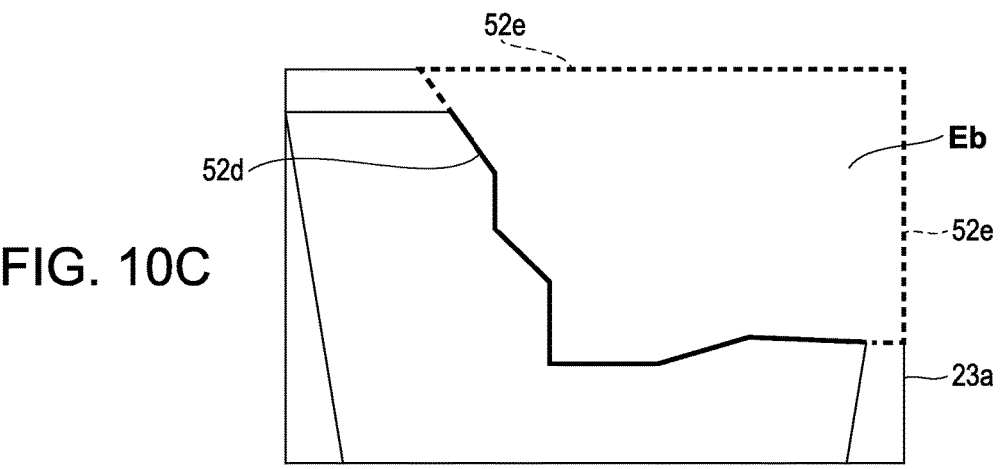
FIG. 10C is a diagram showing the state in which the black level adjustment process is performed on the black level area.

Subsequently, FIGS. 10A through 10C show the case in which the keystone correction is performed, the blending process is performed in the left part and the lower part, and the guide line 52 is fixed in the state (one roughly L type) shown in FIG. 10A. Also in the present example, since the end portions of the guide line 52 fail to reach the frame of the pixel area 23a, the end portions of the guide line are extended to the frame of the pixel area 23a as shown in FIG. 10B. By adding the extension guide line 52e to the definite guide line 52d as described above, two closed areas are formed in the present example, and the area not including the blending area 65 shown in FIG. 10A out of these areas is set as the black level area Eb. Further, the black level adjustment is performed on the black level area Eb thus set as shown in FIG. 10C.

Figure 11A:
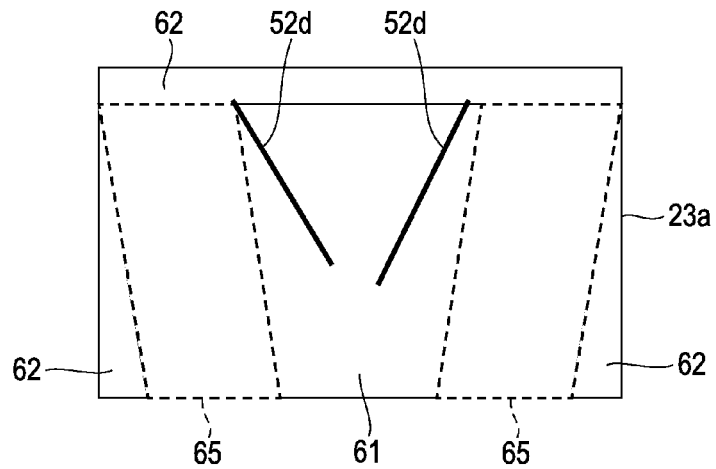
FIG. 11A is a diagram showing an example of definite guide lines (two crossing line type).
Figure 11B:
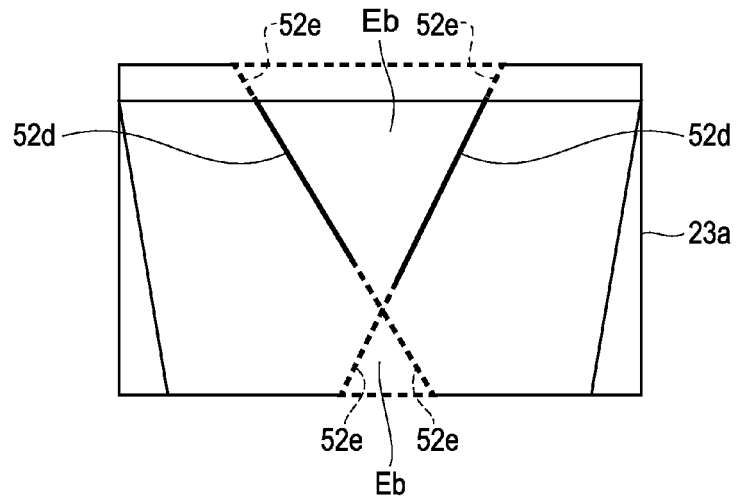
FIG. 11B is a diagram showing the state in which the black level area is set based on the definite guide lines).
Figure 11C:
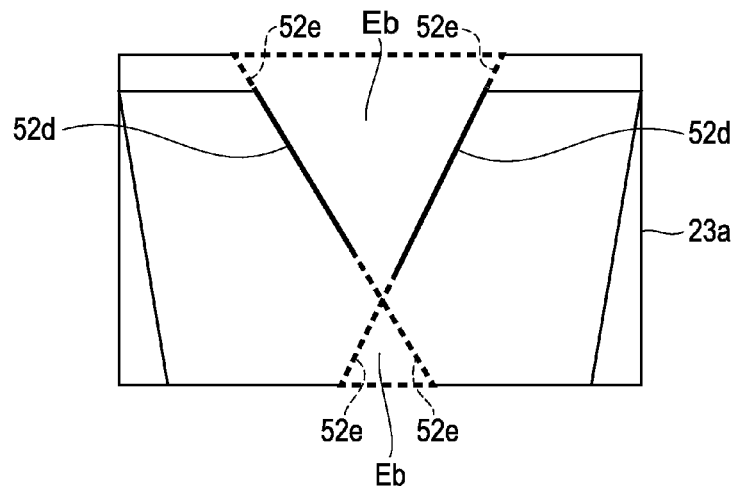
FIG. 11C is a diagram showing the state in which the black level adjustment process is performed on the black level area.

Subsequently, FIGS. 11A through 11C show the case in which the keystone correction is performed, the blending process is performed in the left part and the right part, and the guide lines 52 are fixed in the state (two crossing type) shown in FIG. 11A. Also in the present example, since the end portions of the guide lines 52 fail to reach the frame of the pixel area 23a, the end portions of the guide lines are extended to the frame of the pixel area 23a as shown in FIG. 11B. Due to the extension described above, four closed areas are formed in the present example, and two areas not including the blending area 65 shown in FIG. 11A out of these areas are set as the black level areas Eb. The black level adjustment is performed on the two black level areas Eb thus set as shown in FIG. 11C. As described above, depending on the position adjustment operation result of the guides 51, a plurality of black level areas Eb are set simultaneously in some cases.

It should be noted that in the case in which the plurality of black level areas Eb are set simultaneously as in the example shown in FIGS. 11A through 11C, it is also possible to arrange that the user can select which one of the areas is determined as the black level area Eb. Further, it is also possible to adopt a configuration in which one with the largest area out of the plurality of black level areas Eb is determined alone as the black level area Eb.

As explained hereinabove, according to the present embodiment, since the user interface for the user to set the black level area Eb is provided, the black level area Eb can be set without using the camera. In other words, by the user performing the position adjustment of the guides 51 in accordance with the boundary between the overlapping area and the non-overlapping area while visually recognizing the projection images G (the black raster images) actually projected, it is possible to easily and accurately set the black level area Eb. Further, since the plurality of guides 51 are disposed on the boundary line of the blending area 65 using the blending process result, the process of specifying the overlapping area can be eliminated. Further, compared to the case of sequentially disposing the guides 51 in the state in which no guide is present, the time required until the arrangement of the guides 51 is fixed can be reduced.

Further, since the position adjustment of the guides 51 can be performed taking the entire area of the pixel area 23*a* as a target, even in the case in which the geometric correction is performed, the black level area Eb can be set in the entire pixel area 23*a*. Thus, the black floating due to the leakage light in the non-image forming area 62 can also be resolved besides the image forming area 61 of the pixel area 23*a*. Further, since the number of the guides 51 to be displayed is varied in accordance with the setting of the geometric correction, it is possible to more accurately (appropriately) set the black level area Eb.

Further, since the extension process of the guide line 52 is performed when setting the black level area Eb, the user is not necessarily required to perform the position adjustment of the guides 51 until the guide line 52 reaches the frame of the pixel area 23*a*. Therefore, the operation time necessary for the position adjustment of the guides can be reduced. Further, since the area not including the blending area 65 is set as the black level area Eb out of the plurality of closed areas, it is possible for the user to save the trouble of selecting the black level area Eb after the position adjustment of the guides.

It should be noted that although in the embodiment described above the case of performing the black level adjustment process after the blending process, it is also possible to adopt a configuration not requiring the blending process. On this occasion, in the case in which, for example, an assumed overlapping area, which is assumed to be the overlapping area, is set in the content of the projection image G, it is possible to dispose and display the plurality of guides 51 at roughly regular intervals on the boundary line of the assumed overlapping area (the guide display section 13*a*). Further, even in the case in which the assumed overlapping area is not set in the content of the projection image G, if which part (which side) of the pixel area 23*a* the overlapping area is located can be assumed based on the arrangement of the projector 1 and so on, it is possible for the projector 1 (specifically the control section 16) to uniquely determine the assumed overlapping area, and then dispose and display the plurality of guides 51 on the boundary line of the assumed overlapping area. For example, it is possible to determine the range of a predetermined number of pixels from the ends of the pixel area 23*a* on the assumed overlapping area side (the upper, lower, left, and right side) as the assumed overlapping area, and linearly arrange the plurality of guides 51 at each of the positions. It should be noted that in the case in which the shift amount between the assumed overlapping area thus set and the actual black level area is known in advance, it is also possible to arrange that the plurality of guides 51 are arranged and displayed at the position translated from the boundary line of the assumed overlapping area as much as the shift amount. Further, in the case in which the overlapping area can be assumed, it is possible to form a plurality of closed areas using the definite guide lines 52*d* and the extension guide lines 52*e*, and then set at least one area not including the overlapping area as the black level area Eb. Further, in the case in which no overlapping area can be assumed, it is possible for the user to select which one of the areas is set as the black level area Eb after the plurality of closed areas are formed. According to this configuration, even in the case in which the blending process is not performed, the black level adjustment process can be performed. It should be noted that it is possible to provide an user interface for performing the range designation of the overlapping area taking the case in which the overlapping area in the pixel area 23*a* is not known (fails to be assumed) in advance into consideration. Further, as a modified example of the present embodiment, it is possible to perform setting of the blending area 65. Also in this case, the plurality of guides 51 are disposed at roughly regular intervals on the boundary line of the overlapping area between the projection images G respectively projected by the plurality of projectors 1. Further, after the plurality of closed areas are formed by the definite guide lines 52*d* and the extension guide lines 52*e*, the user selects which one of the areas is set as the blending area 65. According to this configuration, it is possible to set a more appropriate range as the blending area 65 without using the camera.

Further, although in the embodiment described above, it is assumed that the guide line 52 connects the guides 51 adjacent to each other with a straight line, it is also possible to connect the guides 51 with a curve (e.g., a spline curve). Further, it is also possible to change the type of the line for connecting the guides 51 in accordance with the setting of the geometric correction such that the guides 51 are connected with a curve in the case in which the bow correction is performed as the geometric correction, and are connected with a straight line in other cases.

Further, although in the present embodiment, the discharge light source lamp 21*a* is used as the light source section 21, it is also possible to use a solid-state light source such as a laser or an LED.

Further, although in the present embodiment, the transparent liquid crystal display system is adopted as the display system of the projector 1, any display principle can be adopted including a reflective liquid crystal display system, a DLP (Digital Light Processing (a registered trade mark)) system, and so on. Further, the invention can also be applied to a rear projector integrally provided with a transmissive screen.

Further, each of the functions (the processes) of the projector 1 described in the above embodiment can be provided as a program. Further, it is also possible to provide the programs stored in a variety of types of recording media (e.g., a CD-ROM and a flash memory). In other words, the programs for making a computer function as each of the components of the projector 1, and the recording media on which the programs are recorded should be included in the scope of the invention. In addition, the device configuration, the process, and so on of the projector 1 can arbitrarily be modified within the scope or the spirit of the invention.

What is claimed is:

1. A first projector adapted to constitute a part of a system adapted to perform projection on a projection surface so that projection images from a plurality of projectors including the first projector partially overlap each other, the first projector comprising:
    a projection optical system adapted to project the projection image, which is modulated by a light modulation device, on the projection surface;
    a guide display section adapted to display a guide used for setting a black level area, which is an adjustment target area of a black level, on the projection image;
    an operation section adapted to receive a position adjustment operation of the guide;
    a black level area setting section adapted to set the black level area based on an arrangement of the guide on which the position adjustment operation by the operation section has been performed; and a black level adjustment section adapted to correct a brightness of the black level area and a color of the black level area, wherein the black level area does not overlap with a projection image of another projector of the plurality of projectors, and wherein, in a case in which an assumed overlapping area assumed to be overlapped with the projection image of the another projector is set in the projection image, the guide display section disposes and displays the guide at a position based on the assumed overlapping area.

2. The first projector according to claim 1, wherein the guide display section disposes and displays the guide on a boundary line of the assumed overlapping area.

3. The first projector according to claim 1, wherein the operation section is capable of performing the position adjustment of the guide taking an entire area, in which the light modulation device is capable of performing projection, as a target.

4. The first projector according to claim 1, wherein the guide display section displays a guide line connecting the guides together with a plurality of other guides, and in a case in which an area formed of the guide line after the position adjustment operation by the operation section, and an end of an area, in which the light modulation device is capable of performing projection, fails to be a closed area, the black level area setting section extends an end portion of the guide line to the end of the area, in which the light modulation device is capable of performing projection, to thereby form a plurality of closed areas, and then sets at least one of the plurality of closed areas as the black level area.

5. The first projector according to claim 1, wherein the projection optical system projects a black raster image when the black level area setting section sets the black level area.

6. A first projector adapted to constitute a part of a system adapted to perform projection on a projection surface so that projection images from a plurality of projectors including the first projector partially overlap each other, the first projector comprising:

a projection optical system adapted to project the projection image, which is modulated by a light modulation device, on the projection surface;

a guide display section adapted to display a guide used for setting a black level area, which is an adjustment target area of a black level, on the projection image;

an operation section adapted to receive a position adjustment operation of the guide;

a black level area setting section adapted to set the black level area based on an arrangement of the guide on which the position adjustment operation by the operation section has been performed;

a black level adjustment section adapted to correct a brightness of the black level area and a color of the black level area; and a blending processing section adapted to perform a blending process adapted to make an overlapping part inconspicuous, the projection images partially overlapping each other in the overlapping part, wherein the black level area does not overlap with a projection image of another projector of the plurality of projectors, and wherein in a case in which the blending process is performed, the guide display section disposes and displays the guide at a position based on a blending area, which is a target area of the blending process.

7. The first projector according to claim 6, wherein the guide display section disposes and displays the guide on a boundary line of the blending area.

8. A first projector adapted to constitute a part of a system adapted to perform projection on a projection surface so that projection images from a plurality of projectors including the first projector partially overlap each other, the first projector comprising:

a projection optical system adapted to project the projection image, which is modulated by a light modulation device, on the projection surface;

a guide display section adapted to display a guide used for setting a black level area, which is an adjustment target area of a black level, on the projection image;

an operation section adapted to receive a position adjustment operation of the guide;

a black level area setting section adapted to set the black level area based on an arrangement of the guide on which the position adjustment operation by the operation section has been performed;

a black level adjustment section adapted to correct a brightness of the black level area and a color of the black level area; and a geometric correction section adapted to perform a geometric correction for correcting a distortion of the projection image, wherein the black level area does not overlap with a projection image of another projector of the plurality of projectors, and wherein the guide display section varies a number of the guides to be displayed in accordance with a setting of the geometric correction.

9. The first projector according to claim 8, wherein the geometric correction section is capable of performing, as the geometric correction, at least one of a point correction for correcting the distortion of the projection image by a position adjustment of each of intersections of a grid sectioning the projection image, and a bow correction for performing an arc shaped correction on each of upper, lower, right, and left sides of the projection image, and the guide display section varies the number of the guides to be displayed in accordance with at least one of a number of the intersections of the point correction, and presence or absence of the bow correction.

10. A black level area setting method of a projector adapted to constitute a part of a system adapted to perform projection on a projection surface so that projection images from a plurality of projectors including the first projector partially overlap each other, the method comprising:

displaying a guide used for setting a black level area, which is an adjustment target area of a black level, on the projection image;

receiving a position adjustment operation of the guide;

setting the black level area based on an arrangement of a guide on which the position adjustment operation has been performed; and correcting a brightness of the black level area and a color of the black level area, wherein the black level area does not overlap with a projection image of another projector of the plurality of projectors, and wherein, in a case in which an assumed overlapping area assumed to be overlapped with the projection image of the another projector is set in the projection image, the displaying a guide includes disposing and displaying the guide at a position based on the assumed overlapping area.

11. A black level area setting method of a projector adapted to constitute a part of a system adapted to perform projection on a projection surface so that projection images from a plurality of projectors including the first projector partially overlap each other, the method comprising:
    displaying a guide used for setting a black level area, which is an adjustment target area of a black level, on the projection image;
    receiving a position adjustment operation of the guide;
    setting the black level area based on an arrangement of a guide on which the position adjustment operation has been performed;
    correcting a brightness of the black level area and a color of the black level area; and
    perform a blending process adapted to make an overlapping part inconspicuous, the projection images partially overlapping each other in the overlapping part,
    wherein the black level area does not overlap with a projection image of another projector of the plurality of projectors, and
    wherein in a case in which the blending process is performed, the displaying a guide includes disposing and displaying the guide at a position based on a blending area, which is a target area of the blending process.

12. A black level area setting method of a projector adapted to constitute a part of a system adapted to perform projection on a projection surface so that projection images from a plurality of projectors including the first projector partially overlap each other, the method comprising:
    displaying a guide used for setting a black level area, which is an adjustment target area of a black level, on the projection image;
    receiving a position adjustment operation of the guide;
    setting the black level area based on an arrangement of a guide on which the position adjustment operation has been performed;
    correcting a brightness of the black level area and a color of the black level area; and
    performing a geometric correction for correcting a distortion of the projection image,
    wherein the black level area does not overlap with a projection image of another projector of the plurality of projectors, and
    wherein the displaying a guide includes varying a number of the guides to be displayed in accordance with a setting of the geometric correction.

* * * * *